Nov. 24, 1931.  A. KARTVELICHVILI ET AL  1,833,649
AEROPLANE CONSTRUCTION
Filed Aug. 23, 1928   3 Sheets-Sheet 1
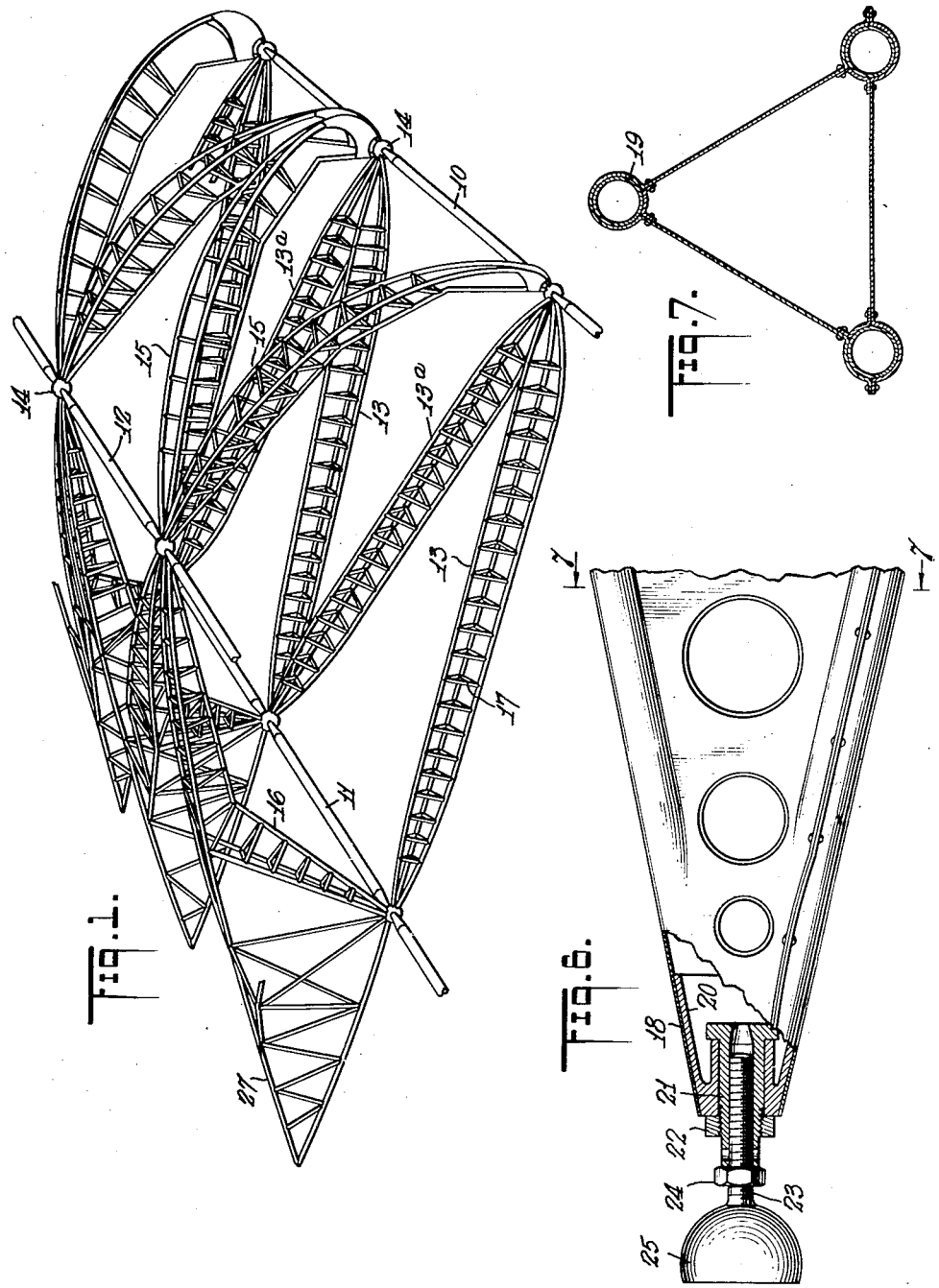
INVENTOR
Alexander Kartvelichvili
Edmond Chagniard
BY Franklin J. Foster
ATTORNEY

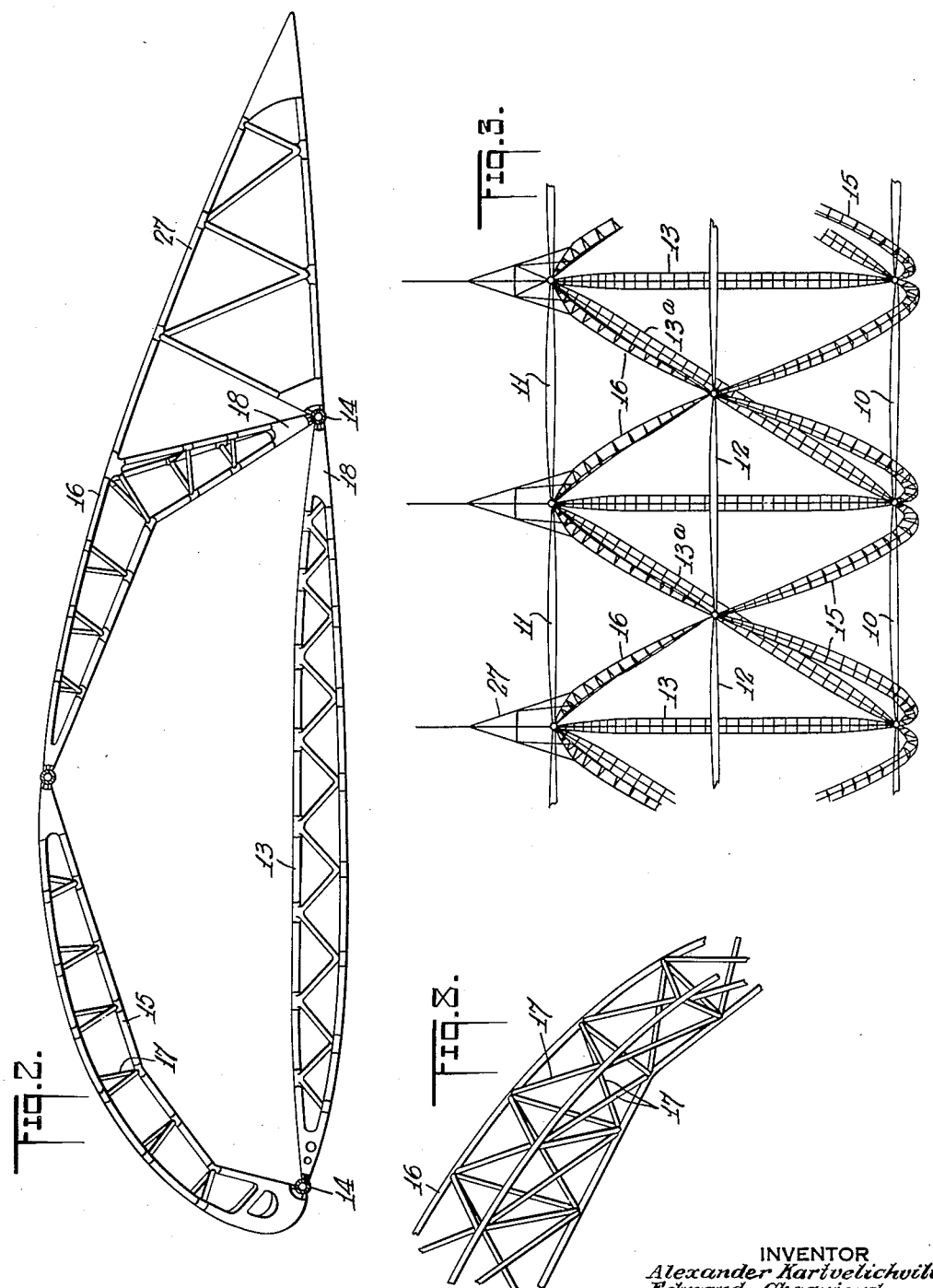

Nov. 24, 1931.  A. KARTVELICHVILI ET AL  1,833,649
AEROPLANE CONSTRUCTION
Filed Aug. 23, 1928    3 Sheets-Sheet 3
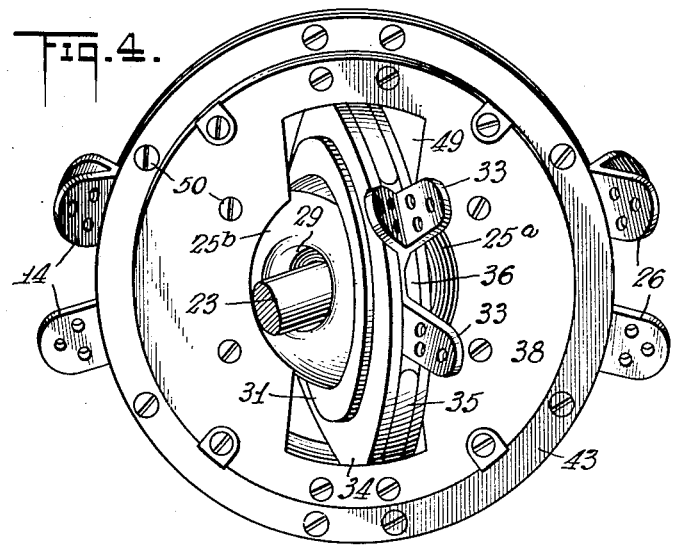
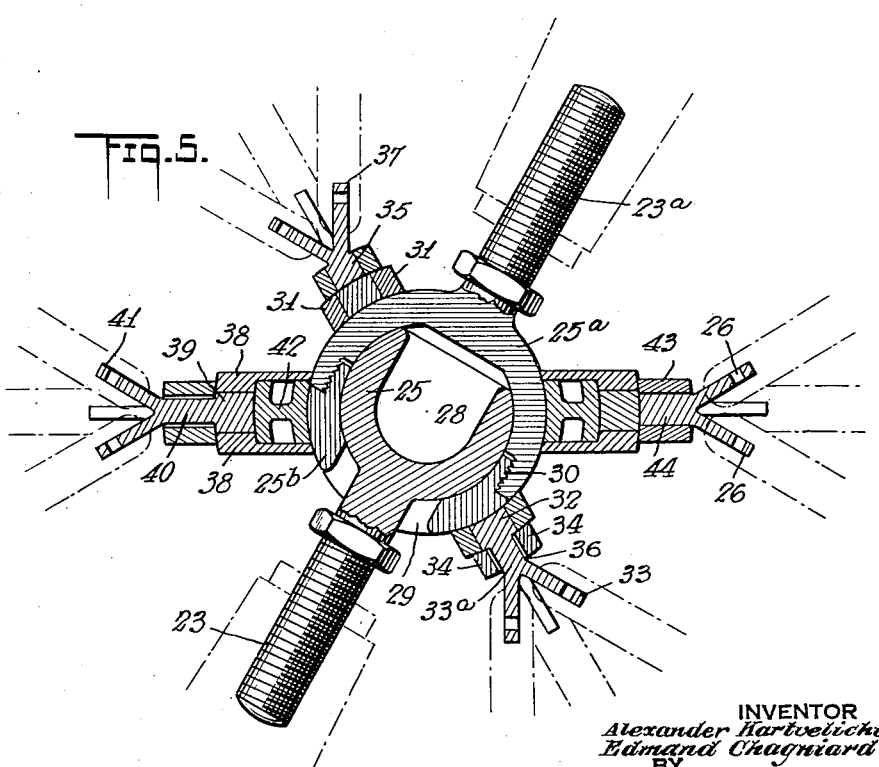
INVENTOR
Alexander Kartvelichvili
Edmand Chagniard
BY
Franklin J Foster
ATTORNEY Patented Nov. 24, 1931

1,833,649

UNITED STATES PATENT OFFICE

ALEXANDER KARTVELICHVILI AND EDMOND CHAGNIARD, OF NEW YORK, N. Y., ASSIGNORS TO CHAGNKART INTERNATIONAL AVIATION CORPORATION, OF NEW YORK, N. Y., A CORPORATION OF NEW YORK

AEROPLANE CONSTRUCTION

Application filed August 23, 1928. Serial No. 301,458.

Our present invention relates to the construction of the wings, bodies, and other strain-sustaining parts of aeroplanes in general. It is especially adapted, however, for embodiment in aeroplanes having large hollow wings which are adapted to carry useful loads.

Conventional aeroplane wing-construction utilizes a series of longérons, ribs and shaping pieces, the longérons serving to support the strain, the ribs to render the wings indeformable, and the shaping pieces to give the desired exterior configuration to the wings. The ribs and longérons have been disposed at right angles to each other. This structural combination has failed to produce a body uniformly resistant to the usual stresses and strains on the wings. So many variable factors enter into the wing construction that it is difficult to calculate accurately the strength of the wing or its resistance to given stresses. It has therefore been the practice to design the wings with a large margin of safety, and a consequent undesirable and needless excess in weight.

Previous efforts to design hollow winged planes have produced wings interiorly crisscrossed and encumbered with various strain-supporting struts, ribs and braces. Hence the interior of such wings have not been clear to receive useful loads even though the wings were strong enough to support them.

By the present invention we overcome the above noted difficulties by the provision of a wing which is substantially hollow yet unencumbered by cross-pieces. The well-known stress-resisting qualities of a triangular unit are utilized and the wing is so designed that triangular units and tetra-hedronal units oppose and resist strains in all directions. The performance of the wing under flying conditions may be very accurately calculated and there is no need for leaving a large margin of safety, and consequently increasing the wing weight. Every element which is used in the wing serves to support the strains, to render the structure indeformable and to assist in the production of the desired exterior shape. The wing structure is in fact a hollow statically determined beam with the minimum number of elements.

The wing is made of a combination of elements, minimum in number, essentially alike as between themselves, and all preferably performing the above noted strain-resisting, form-sustaining and shape-defining functions.

Preferably, we use a series of longérons connected by beams. The beams cooperate with each other to form triangular units which oppose crushing strains, act with the longérons to form triangular units which oppose longitudinal strains, and cooperate with each other and the longérons to define a substantially continuous connected series of tetra-hedrons having common apices which serve to resist strains in any direction.

The beams themselves are preferably of triangular cross sectional shape and self-resistant to crushing strains. In these beams maximum strength is combined with minimum weight.

The strain sustaining beam and longéron elements are preferably disposed closely adjacent the inner surface of the wing covering leaving the entire wing interior free to support useful loads.

Another feature of the invention is the provision of a unique type of substantially universal coupling member which serves to connect the ends of a plurality of adjacent beam members and longéron sections. These couplings are in the nature of spherical universal joints having beam end anchorages substantially universally adjustable about the centers of the couplings, and automatically sustained against any movement relative to the centers of the couplings after the beams and longérons have been attached thereto due to the triangular and tetra-hedronal beam and longéron units above referred to.

Other and more general objects of the invention are to provide an aeroplane of simple, practical construction, which will be rugged, durable and efficient in use, and well suited to the requirements of economical manufacture.

With the above noted and other objects in view, the invention consists in certain novel features of construction and combinations and arrangements of parts as will be more fully hereinafter set forth and pointed out in the claims. The invention may be more fully understood from the following description in connection with the accompanying drawings, wherein:

Figure 1 is a fragmentary perspective view showing the skeleton of an aeroplane wing embodying the present invention.

Figure 2 is a transverse sectional view therethrough, but showing a slight modification.

Figure 3 is a top plan view thereof.

Figure 4 is a perspective view of one of the universal coupling members.

Figure 5 is a transverse sectional view through such coupling member.

Figure 6 is a fragmentary elevational view of one of the beam ends.

Figure 7 is a transverse sectional view on the line 7—7 of Figure 6.

Figure 8 is a perspective detail showing a modified preferred form of beam construction.

Figures 1, 2 and 3 of the drawings in order to avoid undue complexity are somewhat diagrammatic.

The accompanying drawings are illustrative of only one preferred embodiment of the invention, and are not to be interpreted in a limiting sense. For instance, we have shown a wing structure in which three longérons are used, but it will be obvious that we are not to be limited in this respect.

In Figure 1 numerals 10 and 11 designate parallel longérons disposed at the leading edge of the wing and toward the trailing edge respectively. A third substantially parallel longéron 12 is arranged well above and between the longérons 10 and 11. Substantially horizontally disposed beam members 13 arranged in parallelism with each other connect the longérons 10 and 11. The longérons are preferably of sectional formation; the sections being of a length equal to the distance between the beams 13. The ends of the longéron sections are connected to the ends of the beams by coupling members 14 illustrated diagrammatically in Figures 1, 2 and 3 and in detail in Figures 4 and 5. Such couplings also serve to anchor the ends of diagonal beams 13a connecting opposite ends of adjacent beams 13 and cooperatively forming triangles with the beams 13 and longérons.

The longéron 12 includes sections which are preferably equal in length to the sections of the longérons 10 and 11. The joints 14, however, which connect the sections of the longérons 12 are laterally staggered as well as upwardly offset relatively to the joints 14 of the longérons 10 and 11.

Preferably, the joints 14 of the longéron 12 are disposed above the centers of the beams 13a, i. e., midway between the beams 13, 13.

Beams 15 connect the longéron 10 and the longéron 12, and beams 16 connect the longéron 11 and the longéron 12. The ends of the beams 15 and 16 are secured to the joints 14, 14 of the respective longérons and the beams 13, 15 and 16 cooperatively form triangles, the upper apices of which are laterally offset from the bases of the triangles. Likewise, beams 13a, 15 and 16 form triangles, the planes of which are substantially vertical.

It will also be noticed that the beams 15 cooperatively with the sections of the longérons 10 and 12 form rigid triangles resisting longitudinal wing stresses. In a similar manner the beams 16 cooperate with the sections of the longérons 11 and 12 to form strain-resisting triangles.

The triangular arrangement produced by the beams and longérons results also in the formation of a plurality of tetra-hedrons, the six edges of which may be represented by one beam 13, the longéron section 12 above it and the pairs of beams 15, 15, and 16, 16 which connect the ends of beam 13 to the ends of such longéron section.

It will be evident that the beams may be of rectilinear, curvilinear, or rigid angular formation. In fact, Figure 1 illustrates all three types used in the construction; the beams 13 being rectilinear, beams 15 curvilinear, and beams 16 angular.

The principle of using rigid triangular structures to brace the wing is also carried out in the individual beams. These beams are of skeleton formation including three ribs. The beam ribs converge at their ends and are connected together by a system of braces arranged in triangles which render the system rigid and statically determined. The wing structure thus becomes a statically determined beam with the minimum number of elements. It is known that such a beam must satisfy the following formula:

$$b = 3n - 6$$

where $b$ is the number of members and $n$ is the number of apex points. It is readily observable, by taking two adjacent tetra-hedronal units, that this formula is satisfied since two adjacent tetra-hedrons have eighteen elements and eight apex points, the formula thus being $18 = 3 \times 8 - 6$.

The form of triangulated rib bracing shown in Figure 8 is preferred. In this form each pair of adjacent ribs is coupled by a triangle-forming series of zig-zag bracing bars 17.

It will be noted that we have illustrated two types of beams in the drawings. In one instance as in Figures 6 and 7, the three ribs near their points of convergence are secured within a substantially pyramidal casing member 18 of triangular cross-section, this casing member being provided at its corners with sleeves 19 for the reception of the ends of the ribs. Fitted into the apex of the pyramidal casing 18 is a conical casing 20 carrying a tubular internally threaded socket member 21 which may be axially adjusted and locked in position by a nut 22. This socket member receives a threaded bolt 23 carrying a locking nut 24, and the end of the bolt is provided with one of the cooperating sections 25 of the universal joint which we shall later describe.

In the other type of beam illustrated, the ends of the ribs are directly connected to properly disposed ears 26 (Figure 5) on the coupling.

In many instances it is a little difficult to obtain the desired exterior wing configuration by simply using the beams themselves, and we therefore provide false form-defining and sustaining frame members 27 also embodying rigid triangular forms throughout. These dummy frames are preferably rigidly connected to the joints of the sectional longéron 11 and to the angles of the beams 16.

When the plane is in flight, or at rest, there is very little strain sustained by the dummy members 27, and they may be of fairly fragile construction as compared to the strain sustaining beams and longérons.

Obviously, the longérons might also be of the same skeleton construction and the same triangular cross-section as the beams 13, 15 and 16, but to avoid complexity of illustration we have simply shown the longérons as ordinary tubular rods. It may be noted at this juncture that not only the wing of the plane, but the entire plane body is preferably formed of similar triangular beam units, the beams used in the body frame construction being of course of smaller dimensions and lighter weight than those used in the relatively massive hollow wings.

We have devised a unique type of coupling member with which any number of beams, longérons and dummy frame members may be conveniently connected together and held in the desired angular relationship. The previously mentioned coupling member section 25 is in the nature of a ball hollowed out as at 28 to lighten its weight. A co-operating generally hemispherical socket member 25a is carried by a corresponding bolt 23a adapted to be secured in another beam. Ball 25 fits within the socket 25a and is retained therein by an approximately semi-spherical complementary socket section 25b having an opening 29 therein to receive the bolt 23 and screwing into the mouth of the socket 25a as at 30.

Socket member 25a thus provides a substantially spherical construction about which ring members carrying supplemental beam attaching means are rotatably adjustable. All of the ring members include three sections, two outer retaining rings and a central coupling element supporting ring. In the innermost of the rings we have designated the outer ring sections at 31, the coupling member carrying section at 32, and the coupling members at 33. These coupling members are in the nature of apertured ears integral with the arcuate carrier member 32 and adapted to be secured to the ends of the beam ribs.

Rotatably mounted on the ring 31 and 32 is an outer ring including annular outer sections 34 and an arcuate coupling carrier section 35, the latter being slotted or cut away as at 36 in order to accommodate the integral connection 33a between the member 32 and its ears 33. Corresponding ears 37 are carried by the member 35 and adapted to be attached to a beam end as indicated in dotted lines in Figure 5.

A third ring unit is mounted for adjustment directly on the surface of the spherical socket 25a; this ring unit including side rings 38 and a central arcuate member 39 disposed between them and carrying a reduced extension from which project the attaching ears 41.

The weight of the device is lightened by the use of a relatively light-weight filler piece 42 of H-shape in cross section lying between the rings 38 and serving as an abutment for the member 39. Members 38 and 42 are cut away as at 49 to clear the first two ring units and permit adjustment thereof.

The fourth and last ring unit rides on the surface of the ring unit 38, 39 and includes annular ring members 43 between which is adjustably mounted an arcuate member 44 carrying the attaching ears 26. The member 44 is of course cut away to accommodate the reduced extension 40 of the member 39.

Each ring unit includes three sections, the two outer annular guiding sections and the inner arcuate coupling carrying section. With these sections in proper position of adjustment they are preferably secured together as by screws 50 or other appropriate securing devices. If desired, blocks may be used to fill the slots 36, 44.

All of the coupling elements, (by which we mean to include the bolts 23, 23a and the ears 26, 33, 37 and 41) are substantially universally adjustable about the center of the socket 25a. Obviously, this structure is peculiarly well suited for coupling the converging ends of a plurality of angularly disposed beam members, longéron members and dummy frame members.

It is to be understood, however, that the coupling member which we have shown in Figures 4 and 5 is illustrative of only one preferred embodiment of coupling, and that various equivalent coupling devices might be used.

In fact numerous changes and alterations might be made in the general form and arrangement of the parts described without departing from the invention. We do not wish to limit ourselves, therefore, to the details illustrated but shall consider ourselves at liberty to make all changes and alterations which fairly fall within the spirit and scope of the appended claims.

We claim:

1. An aeroplane skeleton frame including a plurality of frame members, each being strain-resisting, form-defining and form-sustaining and means coupling the ends of said members together to define rigid tetrahedronal frame units.

2. A skeleton frame for hollow aeroplane wings including three longérons lying adjacent the proposed surfaces of the wing, sets of beams connecting each longéron to the other two and lying adjacent the proposed surface of the wing, each set of beams together with the longérons which it connects defining triangular frame units.

3. A statically determined skeleton frame for hollow aeroplane wings including three longérons lying adjacent the proposed surfaces of the wing, beams connecting said longérons and lying adjacent the proposed surface of the wing, said beams and longérons cooperatively defining triangular frame units, each beam and longéron serving as a strain-resisting, form-defining and form-sustaining member.

4. In a hollow aeroplane wing construction, a pair of spaced parallel front and rear longérons, a third top longéron disposed above and between them, sets of beams connecting said top longéron to the front and rear longérons, sets of beams connecting the front and rear longérons together, each set of beams coacting with the longéron elements which it connects to form rigid triangular frames.

5. In a hollow aeroplane wing construction, a pair of spaced parallel front and rear longérons, a third top longéron disposed above and between them, beams connecting said top longéron to the front and rear longérons, and beams connecting the front and rear longérons together, each of said beams and said longérons lying approximately at the surface of the wing and serving as a strain resisting, form-defining and sustaining member.

6. In a hollow statically determined aeroplane wing construction, a pair of spaced parallel front and rear longérons, a third top longéron disposed above and between them, beams connecting said top longéron to the front and rear longérons, and beams connecting the front and rear longérons together, said beams and longérons lying approximately at the surface of the wing and each serving as a strain-resisting, form-defining and sustaining member, and all cooperating to define rigid triangular and tetra-hedronal frame units.

7. In a hollow aeroplane wing construction, a pair of spaced parallel front and rear longérons, a third top longéron disposed above and between them, beams connecting said top longéron to the front and rear longérons, beams connecting the front and rear longérons together, the said beams being arranged in three approximately zigzag series defining triangles with sections of the longérons which they connect.

8. In a hollow aeroplane wing construction, a pair of spaced parallel front and rear longérons, a third top longéron disposed above and between them, beams connecting said top longéron to the front and rear longérons, beams connecting the front and rear longérons together, the first mentioned beams being arranged in two approximately zig-zag series defining triangles with sections of the longérons which they connect, and the second mentioned series of beams being arranged in a similar series.

9. In a hollow aeroplane wing construction, a pair of spaced parallel front and rear longérons, a third top longéron disposed above and between them, beams connecting said top longéron to the front and rear longérons, beams connecting the front and rear longérons together, the first mentioned beams being arranged in two approximately zig-zag series defining triangles with sections of the longérons which they connect, and the second mentioned series of beams being arranged in parallel relationship and cooperating with two beams of each of the other series and with an overhead longéron section to define tetrahedrons.

10. An aeroplane skeleton frame for statically determined wings having unobstructed hollow load carrying interiors including a plurality of frame members each of which are strain-resisting, form-defining and form-sustaining, means coupling the ends of all said members together to define rigid triangular and tetra-hedronal frame units.

11. An aeroplane skeleton frame including a plurality of strain-resisting, form-defining, form-sustaining frame members, means coupling the ends of said members together to define rigid triangular frame units, said coupling members including coupling elements connected together for universal movement about a common center.

12. A hollow aeroplane wing construction as set forth in claim 4 wherein the sets of beams additionally define triangles with each other.

13. A wing construction as set forth in claim 4 and wherein the longérons and beams cooperate to form rigid adjacent tetrahedrons having certain beams in common.

Signed at New York city, in the county of New York and State of New York, this 21st day of August, 1928.

ALEXANDER KARTVELICHVILI.
EDMOND CHAGNIARD.